United States Patent [19]

Verdier

[11] 3,998,256
[45] Dec. 21, 1976

[54] TIRE WITH TREAD BLOCKS HAVING IDENTICAL, CIRCULAR ELLIPSES OF INERTIA

[75] Inventor: Henri Verdier, Beauregard-l'Eveque, France

[73] Assignee: Compagnie Generale des Etablissements Michelin, raison sociale Michelin & Cie, Clermont-Ferrand (Puy-de-Dome), France

[22] Filed: June 27, 1974

[21] Appl. No.: 483,643

[30] Foreign Application Priority Data

July 5, 1973   France .................................. 73.25022

[52] U.S. Cl. ............................. 152/209 R; 152/209 B
[51] Int. Cl.² .............................................. B60C 11/06
[58] Field of Search ...... 152/DIG. 3, 209 R, 209 D, 152/154, 209 B; D12/136, 138, 139, 140

[56] References Cited

UNITED STATES PATENTS

| | | | |
|---|---|---|---|
| 50,840 | 5/1917 | Kocontes | D12/138 |
| 57,071 | 2/1921 | Atkinson | 152/209 D |
| 62,682 | 7/1923 | Weber | D12/139 |
| 3,682,220 | 8/1972 | Verdier | 152/209 R |

FOREIGN PATENTS OR APPLICATIONS 1,471,437   1/1967   France .......................... 152/209 R

*Primary Examiner*—Drayton E. Hoffman
*Attorney, Agent, or Firm*—Brumbaugh, Graves, Donohue & Raymond

[57] ABSTRACT

The tread of a pneumatic tire is formed with relief blocks and with grooves that delimit the relief blocks and that open onto the edges of the tread. The relief blocks have sections parallel to their surface of contact with the ground which have central ellipses of inertia which are substantially circular and identical. At least some of the relief blocks are formed with a recess and with a straight connecting groove communicating with the recess and with the closest delimiting groove. The delimiting groove provide paths for the removal of water during travel of the tire on a wet road that extend obliquely forward in the direction of travel and facilitate discharge of water at the edges of the tread.

5 Claims, 9 Drawing Figures

TIRE WITH TREAD BLOCKS HAVING IDENTICAL, CIRCULAR ELLIPSES OF INERTIA

BACKGROUND OF THE INVENTION

This invention relates to pneumatic tires and, more particularly, to new or recapped road tires having a novel and highly-effective tread.

Ordinarily the arrangements of the elements constituting the treads of tires are selected for a particular use or use in a particular season or else in order to remedy some inadequacy of a given arrangement. This selection is furthermore governed by the desire not to harm the other properties which are indispensable for the tread in question. The result is that these arrangements constitute compromises which frequently prevent deriving complete benefit from the means used.

SUMMARY OF THE INVENTION

An object of the invention is to provide a road tire having a tread that satisfies three essential requirements and does so by a combination of features that are fully compatible with one another.

The three essential requirements of such a tread are as follows, the order in which they are enumerated indicating no preference for, or preponderance of, one over another.

One essential requirement is to ensure the accurate steering of a vehicle equipped with the tires, whatever the conditions of travel; another essential requirement is to ensure low, uniform wear of the elements in relief, whatever their location in the tread; the third principal requirement is to ensure the discharge of water, when the tire runs on a wet road, not only in the entire area of contact but also in the vicinity thereof and under the blocks in relief which are in contact with the road.

These and other requirements are met by the joint use of a number of basic ideas which relate both to the configuration of the relief elements and to their arrangement and delimitation by means of recessed elements in the tread.

Thus the precise steering of the vehicle requires a high resistance to deformation in all directions of the relief blocks to forces applied tangentially to their surface of contact with the road. On the other hand, uniformity of wear of the relief blocks requires blocks which are of identical stiffness or similar stiffness in their entirety so as to oppose flexing under the effect of a tangential stress from any direction. Finally, the discharge of water requires an arrangement of the relief elements which facilitates the accommodation of the depth of water which accumulates in front of the area of contact, the lateral channeling and ejecting of the drained water in the area of contact, as well as the displacement and expulsion of the film of water at the interface between the road and the relief elements of the tread.

A tire in accordance with the invention, provided with a tread having relief blocks defined by grooves opening onto the edges of the tread, is characterized in that the relief blocks have plane sections parallel to their surface of contact with the ground, which present substantially circular, identical central ellipses of inertia, at least some of these relief blocks having a recess which is the starting point for an internal groove which connects substantially in a straight line with the nearest delimiting groove, and in that the grooves which delimit the relief blocks have a contour which, on the average, whatever the direction of travel of the tire, follows a line which is oriented obliquely in the direction of travel and opens onto the edge of the area of contact of the tire with the ground.

The central ellipse of inertia of a plane section of a solid is an ellipse whose two axes intersect at the center of gravity of the section. This ellipse makes it possible to calculate the moment of inertia $I_\alpha$ of the section with respect to any axis passing through the center of gravity and forming an angle $\alpha$ with one of the main axes, if the main moments of inertia $I_x$ and $I_y$ with respect to the two axes of the ellipse are known. The equation is:

$$I_x\cos^2\alpha + I_y\sin^2\alpha = I_\alpha$$

When the two principal moments $I_x$ and $I_y$ have values that are nearly equal, the two axes of the ellipse have lengths that are nearly equal and the ellipse is substantially circular.

On the other hand, a relief block of the tread can be considered to be a solid anchored in the bottom of the tread. The section of the block in the plane where it is anchored to the tread is close to the section in contact with the road, and the block can be considered a prismatic solid. The deflection of such a block under the effect of a force tangential to its section in contact with the ground is inversely proportional to the moment of inertia of its plane section, calculated with respect to the axis of said section perpendicular to the direction of the force. In accordance with the invention, blocks are employed whose section has principal moments of inertia which are equal or nearly so. Thus the deflections of the blocks are practically the same whatever the direction of the tangential force in the area of contact.

Also in accordance with the invention, blocks are used whose sections have large main moments of inertia in order to reduce the deflection of these blocks while making it uniform. Preferably, the invention provides for the use of relief elements in connection with which the ratio between the smaller principal moment of inertia ($I_x$ or $I_y$) and the surface of the section is as large as possible for a given section surface.

Sections of different contours and sizes may have ellipses of inertia that are the same or nearly the same; the application of the means in question can therefore imply the presence, in the area of contact, of blocks of different sections and/or contours provided that the outline of the grooves delimiting the blocks is in accordance with the invention.

The blocks in accordance with the invention are provided with a recess which is oriented radially (with respect to the tire) and connected by a straight groove that opens into the nearest delimiting groove. In order to avoid interfering with the symmetry of the ellipse of inertia, the radial recess is preferably located in the vicinity of the center of gravity of the section of the block and is wider than the straight groove connecting it to the nearest delimiting groove. The depth of the radial recess, as well as that of the straight groove, may be equal to that of the delimiting groove.

The radial recess and the corresponding straight connecting groove have the function of collecting the water under the block and evacuating it over the shortest path. It will be understood that the invention applies to any tread for highway tires whatever the type of tire and whether the tread is symmetrical or asymmetrical. The invention also applies to treads which, in order to reduce the noise of travel, have so-called "variable pitch" elements or blocks, provided that the variation of the pitch does not result in excessive variation between the central ellipses of inertia. Moreover, the blocks may have additional cuts or slits of no physical thickness, which may or may not open into the delimiting grooves.

BRIEF DESCRIPTION OF THE DRAWING

A better understanding of the invention may be gained from a consideration of the following detailed description of the preferred embodiments thereof, in conjunction with the appended figures of the drawing, wherein.

DESCRIPTION OF THE PREFERRED EMBODIMENTS

Figure 1:
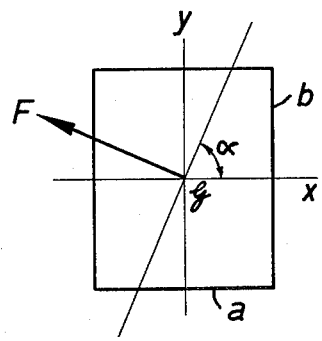
FIG. 1 is a schematic plan view of a section of a block having a substantially circular ellipse of inertia.

In FIG. 1 there is shown a rectangular section of a block the sides of which have the lengths $a$ and $b$. The principal moments of inertia with respect to axes $G_x$ and $G_y$ passing through the center of gravity and parallel to the sides of length $a$ and $b$, respectively, have the value $$I_x = \frac{a b^3}{12} \text{ and } I_y = \frac{b a^3}{12}.$$

The moment of inertia with respect to an axis forming an angle $\alpha$ with the $G_x$ for instance will have the value:

$$I_\alpha = \frac{a b}{12} (b^2 \cos^2\alpha + a^2 \sin^2\alpha).$$

When the dimensions $a$ and $b$ of the section are approximately the same, $I_x \simeq I_y$. The result is that the moment of inertia with respect to any axis $G_\alpha$ is substantially constant since $I_\alpha \simeq I_\alpha (\cos^2\alpha + \sin^2\alpha)$.

Figure 2:
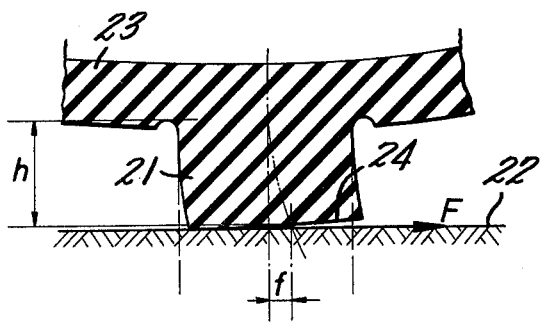
FIG. 2 is a sectional view in elevation showing the deflection of a block acted on by a force tangential to its surface of contact with the road.

In FIG. 2 there is a block 21 shown in contact with the road 22 and implanted or anchored in the tread 23 of a tire. The block 21 is acted on by a tangential force F applied to its face 24 in contact with the road 22. The force F may be due, for example, to acceleration, braking or turning of the vehicle on which the tire incorporating the tread is mounted. The element 21 at the surface 24 undergoes a deflection $$f = \frac{F h^3}{3 E I_\alpha}.$$

In this formula:

$h$ is the height of the block 21 measured radially with respect to the tire;

E is the modulus of elasticity of the rubber forming the block 21; and $I_\alpha$ is the moment of inertia of a plane section parallel to the road-contacting surface of the tread with respect to an axis $G_\alpha$ which lies in the plane and is oriented perpendicular to the force F (see FIG. 1) acting on the block 21.

The flexure tends to incline the end surface 24 in contact with the ground. The forms of irregular wear which are customarily observed on the face 24 of the blocks 21 are attributed to this inclination. Since the flexure $f$ is proportional to $1/I_\alpha$, there is provided in accordance with the invention a moment of inertia $I_\alpha$ which is as high as possible for the sections of the blocks 21. This moment of inertia must furthermore be approximately the same whatever the orientation of the deforming force F; that is to say the central ellipse of inertia of the section of the blocks 21 must be substantially circular.

Very generally, any plane surface deliminated by a contour having an axis of symmetry (perpendicular to said surface) of an order greater than 2 constitutes a section of circular central ellipse of inertia. Examples of such contours are an equilateral triangle, a square, a cross having three, four or $n$ equal branches, polygons having five, six, etc., equal sides, and a circle.

Figure 3:
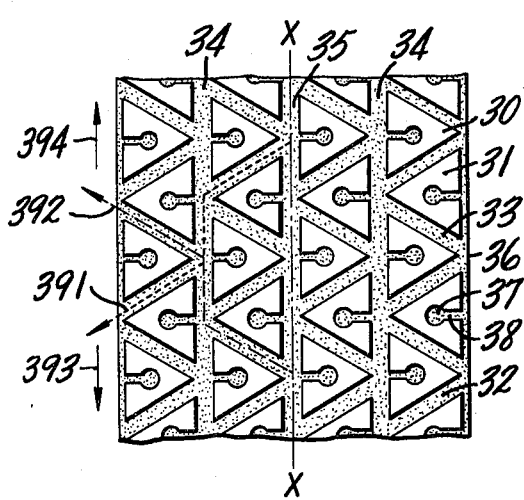
FIGS. 3 to 9 are developed plan views of a limited sector of a tread showing various exemplary embodiments of blocks and the grooves delimiting the blocks in accordance with the invention.

FIG. 3 shows a sector of a tread in accordance with the invention, the longitudinal axis being indicated by the dashed line X—X. In this figure there can be noted four circumferential rows of identical blocks 30, 31 having the section of equilateral triangles. In each row, the blocks 30, 31 are arranged head-to-foot and are delimited with respect to the others in the circumferential direction by oblique grooves 32, 33 directed alternatively to the right 32 and to the left 33. These oblique grooves 32, 33 open either into linear circumferential grooves 34, 35 delimiting the bases of the triangles 30, 31 or into the edges 36 of the tread. The relief blocks 30, 31 are provided at their center with a radial recess 37 which communicates with a straight connecting groove 38 perpendicular to the circumferential grooves 34, 35. However, in accordance with the invention, the openings 38 may empty into the oblique grooves 32 or 33.

As indicated by the dashed lines 391 and 392, the system of grooves 32 to 35 delimiting the blocks 30, 31 is so designed that, in accordance with the invention, the water can be discharged obliquely towards the front, whatever the direction of travel of the tire. The arrow 393 indicates one direction of travel of the tire and corresponds to the line of flow 391, and the arrow 394 indicates the other direction of travel of the tire and corresponds to the line of flow 392.

Figure 4:
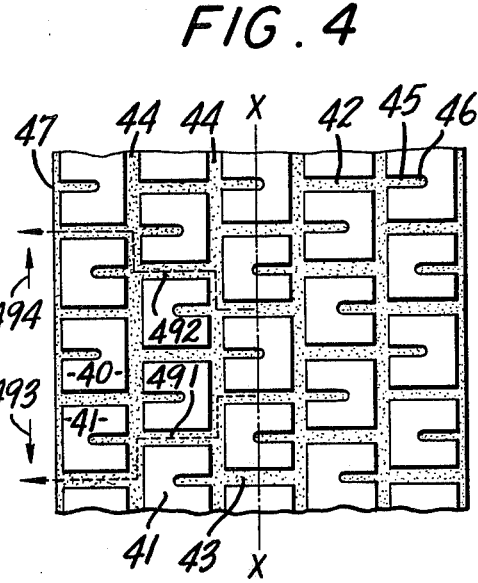

FIG. 4 shows a sector of another tread in accordance with the invention, the longitudinal axis being indicated by the dashed straight line X—X. This embodiment of the invention provides five circumferential rows of blocks 40, 41 of identical square section. The blocks 40 of one row are staggered half of a width with respect to the blocks 41 of the adjacent row, by means of transverse delimiting grooves 42, 43. The transverse grooves 42, 43 provide communication of the adjacent circumferential delimiting grooves 44 with each other. Furthermore, the blocks 40, 41 are provided with a straight connecting groove 45 commencing at their center 46 and discharging perpendicularly alternatively to the right and to the left into the circumferential delimiting grooves 44 or onto the edges 47 of the tread. However, these openings 45 might, without going beyond the scope of the invention, be directed at random transversely to the right and/or to the left and/or circumferentially towards the front and/or the rear. The lines of oblique flow 491 and 492 for the water in accordance with the invention have also been shown in this figure, as well as the arrows 493 and 494 indicating the directions of tire travel corresponding to them.

Figure 5:
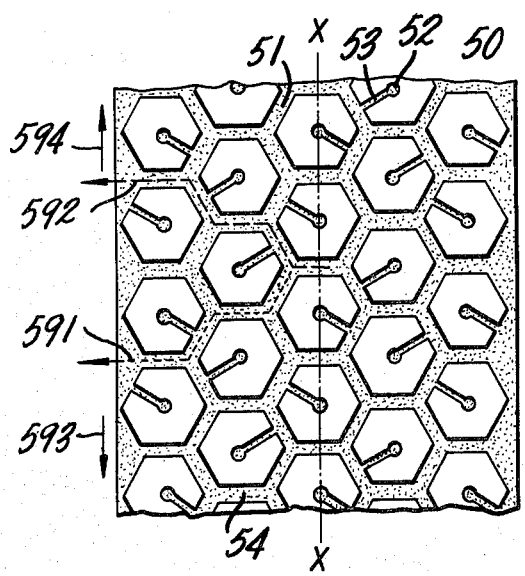

FIG. 5 shows a sector of another tread in accordance with the invention. The blocks 50 in this embodiment have hexagonal sections. The delimiting grooves 51 have a zigzag circumferential course with segments inclined ± 30° with respect to the longitudinal axis X—X. The blocks 50 have central recesses 52 where there originate straight connecting grooves 53 opening into the grooves 51. Two adjacent delimiting grooves 51 are connected by transverse delimiting grooves 54.

Depending on the direction of travel of the tire (593 or 594), the removed water follows an oblique path 591 or 592.

Figure 6:
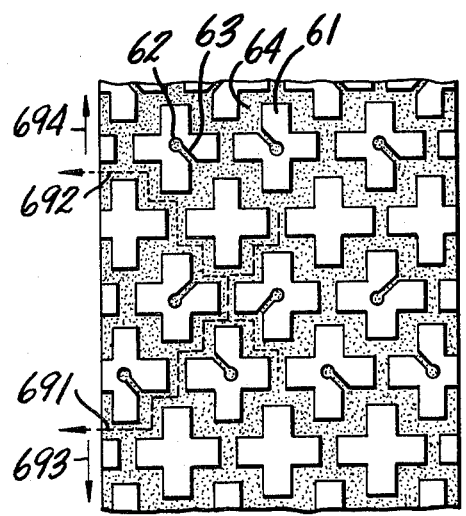

FIG. 6 shows a sector of a tread in accordance with the invention comprising blocks 60 having a section in the form of a cross. These cross-shaped sections may be formed by arranging either four squares or four rectangles around a square. In the example shown, the five squares are identical. Certain blocks such as 61 are provided with a central recess 62 opening via a straight connecting 63 into the closest delimiting groove 64. Depending on the direction of travel of the tire (693 or 694), the removed water follows an oblique path 691 or 692.

Figure 7:
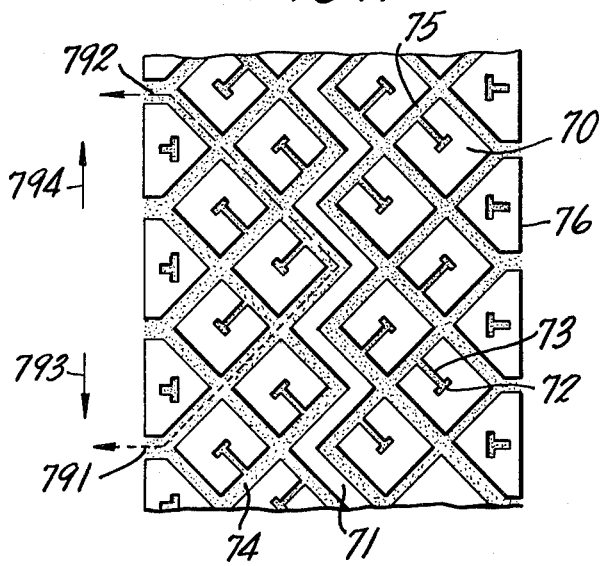

FIG. 7 shows a sector of a tread in accordance with the invention which comprises blocks 70 of square section, a zigzag equatorial rib 71 and lateral blocks 76 of pentagonal section. The blocks 70 are provided with a central recess 72 opening, by means of a straight connecting groove 73, at a right angle into the delimiting groove 74 or 75. Depending on the direction of travel of the tire (791 or 792), the delimiting oblique grooves 74 or 75 expel water onto the edges of the tread.

Figure 8:
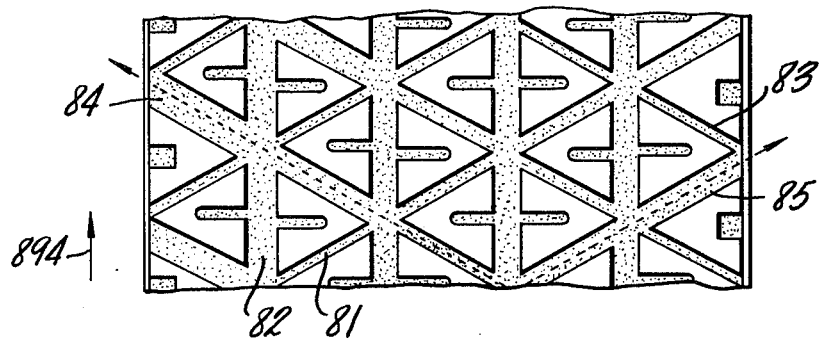

FIG. 8 shows an embodiment in accordance with the invention employing blocks identical to those used in the embodiment of FIG. 3. However, the direction of travel of the tire is preferably in the direction indicated by the arrow 894. This limitation makes it possible substantially to improve the adherence to wet ground without impairing the other advantages provided by the invention. The embodiment shown in FIG. 8 makes it possible, as a matter of fact, to narrow the oblique delimiting grooves, as indicated at 81 and 83, in directions extending obliquely towards the rear with respect to the direction of travel, and at the same time to widen the circumferential delimiting grooves 82 and to widen the oblique delimiting grooves, as indicated at 84 and 85, in directions extending obliquely towards the front with respect to the directions of travel. This ensures very efficient drainage of water when the tire travels in the direction indicated by the arrow 894.

Figure 9:
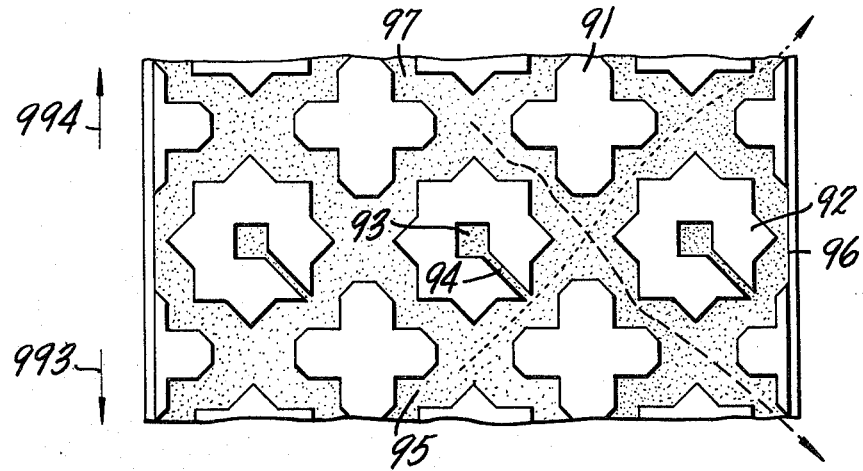

FIG. 9 shows an embodiment in which there are employed blocks 91 and 92 the plane sections of which have different contours but practically identical central ellipses of inertia. The blocks 91 have a cross-shaped section while the blocks 92 have a star-shaped section with 8 branches and are provided with a central recess 93 which is connected by a straight connecting groove 94 with the delimiting groove 93 or the edge 96 of the tread. It will be noted that whatever the direction of travel 993 or 994, the delimiting grooves 97 and 95 ensure drainage towards the front in the direction of travel.

The use of a tread in accordance with the invention on wide tires having a crown whose meridian curvature is smaller (less pronounced than the longitudinal curvature makes it possible to make greater use of the already remarkable qualities of such tires whatever the condition of the road, whether it be dry or wet. Thus with tires of this type of size 205 × 70 VR 14 provided with a tread as shown in FIG. 3 (trianguar blocks), the following advantages are obtained, under equal test conditions, as compared with control tires of the same size with the same reinforcement and a tread made from the same mix but comprising elongated polygonal blocks the largest dimension of which is oriented longitudinally:

| | |
|---|---|
| resistance to wear on highways traveled over at high speed | +21% for the tires mounted on the front axle +14% for the tires mounted on the rear axle |
| speed on very windy and wet roads | +4.3% |
| transverse adherence at the limit skid speed on a circular trajectory of a radius of 50 meters on wet concrete | +8% |
| braking distance from 90 to 80 km/hr on wet, smooth concrete | −12.5% |

With a contact ratio (i.e., the ratio of the radially outer surface area of the blocks in the tire footprint to the total area of the tire footprint) of 65% in the case of the tread in accordance with the invention and 61% in the case of the tread of the control tire, there is in accordance with the invention a substantial improvement in tread life and in the behavior on wet pavement.

Those skilled in the art will understand that the invention includes embodiments in addition to the representative ones disclosed above and is as broad as the appended claims and their equivalents.

I claim:

1. A pneumatic tire comprising a tread formed with a plurality of isolated relief blocks and with grooves that delimit the relief blocks and that open onto the edges of the tread, the relief blocks having sections parallel to their surface of contact with the ground which have central ellipses of inertia which are substantially circular and identical, at least some of the relief blocks being formed with a recess and with a connecting groove communicating with the recess and with the closest delimiting groove, the delimiting grooves providing paths for the removal of water during travel of the tire on a wet road that extend obliquely forward in the direction of travel and facilitate discharge of the water at the edges of the tread, and each connecting groove being substantially straight and extending over substantially the shortest path between said recess and said closest delimiting groove.

2. A tire according to claim 1 wherein the ratio between the smallest principal moment of inertia and the surface of said sections of the relief blocks is maximized.

3. A tire according to claim 1 wherein the recesses are wider than the connecting grooves and are located in the vicinity of the centers of gravity of the respective plane sections of the blocks.

4. A pneumatic tire comprising a tread formed with a plurality of isolated relief blocks and with grooves that delimit the relief blocks and that open onto the edges of the tread, the relief blocks having sections parallel to their surface of contact with the ground which have central ellipses of inertia which are substantially circular and identical, at least some of the relief blocks being formed with a recess and with a connecting groove communicating with the recess and with the closest delimiting groove, the delimiting grooves providing paths for the removal of water during travel of the tire on a wet road that extend obliquely forward in the direction of travel and facilitate discharge of the water at the edges of the tread, and each connecting groove being substantially straight and extending over substantially the shortest path between said recess and said closest delimiting groove, different ones of the blocks having plane sections of different sizes but identical central ellipses of inertia.

5. A pneumatic tire comprising a tread formed with a plurality of isolated relief blocks and with grooves that delimit the relief blocks and that open onto the edges of the tread, the relief blocks having sections parallel to their surface of contact with the ground which have central ellipses of inertia which are substantially circular and identical, at least some of the relief blocks being formed with a recess and with a connecting groove communicating with the recess and with the closest delimiting groove, the delimiting grooves providing paths for the removal of water during travel of the tire on a wet road that extend obliquely forward in the direction of travel and facilitate discharge of the water at the edges of the tread, and each connecting groove being substantially straight and extending over substantially the shortest path between said recess and said closest delimiting groove, different ones of the blocks having different contours but identical central ellipses of inertia.

* * * * *